UNITED STATES PATENT OFFICE.

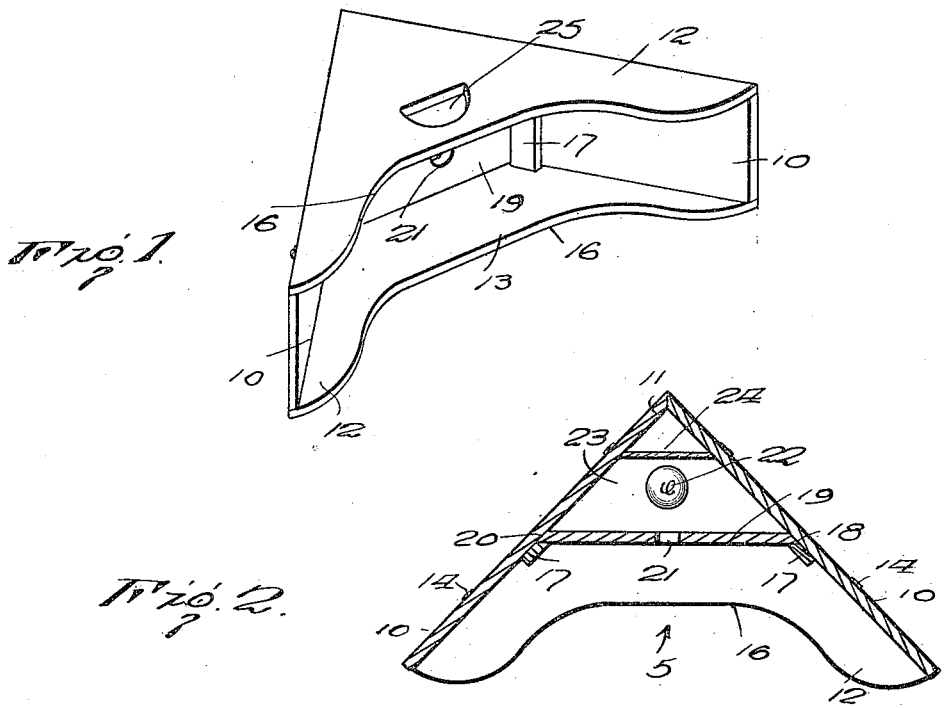

FRANK E. MUSSEHL, OF LINCOLN, NEBRASKA.

DAYLIGHT EGG-CANDLER.

1,373,969.  Specification of Letters Patent.  Patented Apr. 5, 1921.

Application filed September 17, 1918. Serial No. 254,387.

*To all whom it may concern:*

Be it known that I, FRANK E. MUSSEHL, a citizen of the United States, residing at Lincoln, in the county of Lancaster and State of Nebraska, have invented certain new and useful Improvements in Daylight Egg-Candlers, of which the following is a specification.

This invention relates to improvements in egg candlers and more particularly to a device of this character adapted to permit and facilitate the candling of eggs without the necessity of employing a dark room, the candling being done in a light room in the daytime with convenience and facility.

A further object of the invention is to provide an egg candling device of novel construction which includes a series of parts related and put together in a novel manner so as to provide a chamber designed to receive a light source and a reflector so as to project rays through an aperture for rendering visible the consistency and quality of the yolk and white and the size of the air cells in an egg, the candling device providing a dark space or room in contrast to the light entering a room and facilitating the candling operation.

With the above objects and others in view as will appear as the description proceeds, the invention comprises the novel features of construction, combinations of elements and arrangement of parts which will be more fully described in the following specification, and then finally embodied in the clauses of the claim which is appended hereto and which forms an essential part of the same.

Reference is had to the accompanying drawings, forming a part of this application, wherein similar reference characters will refer to corresponding parts throughout of the several views, in which—

Figure 1 is a perspective view looking toward the rear side of the candler,

Fig. 2 is a horizontal sectional view thereof, and

Fig. 3 is a longitudinal sectional view.

Referring to the drawings in detail, my improved egg candler is shown as comprising rectangular side pieces 10 disposed with their inner ends meeting each other at an angle of about 90 degrees as shown at 11, said sides converging forwardly and diverging rearwardly, thus decreasing the space and intensifying the light reflection in the light chamber on account of the angular relationship between the side members. A top wall 12 and a bottom wall 13 are fitted onto the top and bottom edges of the sides 10 as shown, and connected thereto by detachable fastening means 14 in the form of hooks and eyes, nails or the like. These fastening means are carried by the sides, so as to engage the top and bottom walls, thus providing a substantially triangular inclosure or chamber, the open end 15 of which is preferably V-shaped or recessed as shown at 16 to facilitate access within the same in candling eggs.

Disposed transversely on the inner faces of the side walls 10 are strips 17 each having a beveled edge portion 18 producing guide ways 19 between the strips and said side walls to receive a transverse partition 20, the ends of which are correspondingly beveled to adapt them to fit the inner faces of the side walls 10 and adjacent beveled edges of the transverse partition. This wall or transverse partition 20 is provided with a central circular opening 21 through which the light rays from a light source such as an electric bulb indicated at 22, within the light chamber 23, are projected with the assistance of a reflector 24 if desired. A piece of bright tin or similar material may be used as a reflector back of the light as indicated, although it is to be understood that any other suitable light source may be provided.

In the top wall 12 there is provided a sight opening 25, preferably of semi-circular outline with the straight edge thereof disposed adjacent or parallel to the partition 19 so as to render the egg visible in front of the partition.

In the use of the device, the candler is placed so that it will point toward the windows in the light room so as to secure the contrast between the light back of the candler and that coming through the aperture in the partition and the egg contents while the operator is positioned so as to face the open end 15. The egg is held so that the large end will be disposed against the opening 21, and by giving it a brisk turn, the consistency and quality of the yolk and white, as well as the size of the air cells can be determined readily. With a little practice, any one can do accurate work with this candler and it may be used for testing out incubator eggs on the seventh and fourteenth days. The walls of the partition 19 and the side walls 10 at the inner faces thereof may be provided with a black covering so as to facilitate the candling operation in view of the fact that the same is done in a light room, the contrast between the light rays and the light entering the room through the windows, being thus emphasized to a greater degree. The casing is preferably made of one-half inch thick wood, although it can easily be made of any other desired material as specified.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus described my invention, what I claim as new, and desire to secure by Letters Patent, is:

A daylight egg candler comprising a casing substantially triangular in form and open at one side, a partition extending transversely of the casing in parallel relation to the open end thereof and forming in the apex of the same a darkened chamber, a reflector spaced in rear of said partition, and parallel thereto, and a lamp within said darkened chamber between said partition and said reflector, said partition having a focal aperture in alinement with said lamp and the apex point of said casing, the top wall of said casing having a semi-circular sight opening arranged immediately above said focal aperture so as to bring the egg to be candled directly in focus with the line of sight of the operator, the inner surfaces of the walls of said casing and the outer wall of said partition being rendered black to contrast with the light aperture and the natural light of the day.

In testimony whereof I affix my signature hereto.

FRANK E. MUSSEHL.